US008546513B2

(12) United States Patent
Hedrick et al.

(10) Patent No.: US 8,546,513 B2
(45) **Date of Patent: *Oct. 1, 2013**

(54) CATALYTIC POLYMERIZATION OF POLYMERS CONTAINING ELECTROPHIIC LINKAGES USING NUCLEOPHILIC REAGENTS

(71) Applicant: International Business Machines Corporation, Armonk, NY (US)

(72) Inventors: James L. Hedrick, Pleasanton, CA (US); Russell C. Pratt, Oakland, CA (US); Robert M. Waymouth, Palo Alto, CA (US)

(73) Assignees: International Business Machines Corporation, Armonk, NY (US); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,904

(22) Filed: Jan. 7, 2013

(65) Prior Publication Data

US 2013/0123458 A1 May 16, 2013

Related U.S. Application Data

(62) Division of application No. 12/496,535, filed on Jul. 1, 2009, now Pat. No. 8,367,796.

(51) Int. Cl.
*C08G 63/00* (2006.01)

(52) U.S. Cl.
USPC ..................... 528/274; 528/308.1; 528/308.3; 528/336; 564/230; 502/167; 502/200; 548/336.5; 544/247; 544/281

(58) Field of Classification Search
USPC .................. 528/86, 88, 271, 272, 274, 308.1, 528/310, 332, 336; 548/336.5; 544/247, 544/281; 564/230, 238, 241, 242; 502/162, 502/164, 167, 200
See application file for complete search history.

(56) References Cited

U.S. PATENT DOCUMENTS

| | | | |
|---|---|---|---|
| 3,254,054 | A | 5/1966 | Boerma |
| 4,652,667 | A | 3/1987 | Green |
| 4,681,967 | A | 7/1987 | Green |
| 4,797,487 | A | 1/1989 | A'Court |
| 5,319,066 | A | 6/1994 | King |
| 5,418,316 | A | 5/1995 | Kuhling et al. |
| 5,559,159 | A | 9/1996 | Sublett et al. |
| 6,136,869 | A | 10/2000 | Ekart et al. |
| 6,646,103 | B1 | 11/2003 | Le Perchec et al. |
| 6,911,546 | B2 | 6/2005 | Hedrick et al. |
| 6,916,936 | B2 | 7/2005 | Hedrick et al. |
| 6,969,705 | B2 | 11/2005 | Pecquet et al. |
| 7,544,800 | B2 | 6/2009 | Hedrick et al. |
| 2005/0049418 | A1 | 3/2005 | Hedrick et al. |
| 2011/0004014 | A1 | 1/2011 | Hedrick et al. |

FOREIGN PATENT DOCUMENTS

| | | | |
|---|---|---|---|
| EP | 629645 | A1 | 6/1994 |

OTHER PUBLICATIONS

Modern Polyesters: Chemistry and Technology of Polyesters and Copolyesters, p. 90, John Wiley & Sons Ltd., 2003.
Lohmeijer et al., Guanidine and Amidine Organo-Catalysts for Ring-Opening Polymerization of Cyclic Esters, Macromolecules 39:8574-8583 (2006).
Lohmeijer et al., Organocatalytic Living Ring-Opening Polymerization of Cyclic Carbosiloxanes, Organic Letters 8:4683-4686 (2006).
Pratt et al., Triazabicyclodecene: A Simple Bifuncational Organocatalyst for Acyl Transfer Ring-Opening Polymerization of Cyclic Esters, J. Am. Chem. Soc. 128:4556-4557 (2006).
Schuchardt et al., Transesterification of Vegetable Oils: A Review, J. Braz. Chem. Soc. 9(1):199-210 (1998).
Chuma et al., The Reaction Mechanism for the Organocatalytic Ring-Opening Polymerization of L-Lactide Using a Guanadine-Based Catalyst: Hydrogen-Bonded or Covalently Bound?, J. Am. Chem. Soc. 130(21):6749-6754 (2008).
Coles, Bicyclic-guanidines, -guanidinates and -guanidinium salts: Wide Ranging Applications from a Simple Family of Molecules, Chem. Commun. (25):3659-3767 (2009).
Cornils & Herrmann, Applied Homogeneous Catalysis with Organometallic Compounds, Wiley-VCH: Weinheim, Germany, vol. 1: Applications, Chapter 1 (2002).
Kamber et al., Organocatalytic Ring-Opening Polymerization, Chem. Rev. 107(12):5813-5840 (2007).
Kiesewetter et al., Cyclic Guanidine Organic Catalysts: What is Magic About Triazabicyclodecene?, J. Org. Chem. 74(24):9490-949 (2009).
List, Introduction: Organocatalysis, Chem. Rev. 107(12):5413-5415 (2007).
MacMillan, The Advent and Development of Organocatalysis, Nature 455(7211):304-308 (2008).
Nederberg et al., Organocatalytic Ring Opening Polymerization of Trimethylene Carbonate, Biomacromolecules 8(1):153-160 (2007).

*Primary Examiner* — Frances Tischler
(74) *Attorney, Agent, or Firm* — Karen Canaan; CanaanLaw, P.C.; Isaac Rutenberg

(57) ABSTRACT

The disclosure relates to methods and materials useful for polymerizing a monomer. In one embodiment, for example, the disclosure provides a method for polymerizing a monomer containing a plurality of electrophilic groups, wherein the method comprises contacting the monomer with a nucleophilic reagent in the presence of a guanidine-containing catalyst. The methods and materials of the disclosure find utility, for example, in the field of materials science.

20 Claims, No Drawings

CATALYTIC POLYMERIZATION OF POLYMERS CONTAINING ELECTROPHIIC LINKAGES USING NUCLEOPHILIC REAGENTS

CROSS-REFERENCE TO RELATED APPLICATION

This application is a divisional of U.S. patent application Ser. No. 12/496,535, filed on Jul. 1, 2009, which is incorporated in its entirety herein.

ACKNOWLEDGEMENT OF GOVERNMENT SUPPORT

This invention was made with Government support under Grant No. NFS-CHE 0645891 awarded from the United States National Science Foundation; accordingly, the United States Government has certain rights to this invention.

TECHNICAL FIELD

This invention relates generally to the polymerization of monomers, and, more particularly relates to an organocatalytic method for polymerizing monomers. The invention is applicable in numerous fields, including industrial chemistry and manufacturing processes requiring a simple and convenient method for the preparation of polymers.

BACKGROUND OF THE INVENTION

Polymers containing heteroatoms along the backbone play an ever-increasingly important role in modern society, and the variety of such polymers continues to expand at a high rate. For example, poly(ethylene terephthalate) (i.e., poly(oxy-1, 2-ethanediyl-oxycarbonyl-1,4-diphenylenecarbonyl), or "PET") is a widely used engineering thermoplastic for carpeting, clothing, tire cords, soda bottles and other containers, film, automotive applications, electronics, displays, etc. The worldwide production of PET has been growing at an annual rate of 10% per year, and with the increase in use in electronic and automotive applications, this rate is expected to increase significantly to 15% per year.

Polymers with heteroatoms along the backbone are commonly prepared using an addition-type polymerization mechanism, in which monomers react to form dimers, which can in turn react with other dimers to form tetramers. This growth process is allowed to continue until polymers with the desired molecular weight are formed. Unfortunately (and unlike the alternative chain-growth polymerization mechanism), obtaining high molecular weight polymer using this mechanism requires carrying the polymerization reaction to very high conversion.

A frequently-used method for commercial synthesis of (PET) involves a two-step transesterification process from dimethyl teraphthalate (DMT) and excess ethylene glycol (EO) in the presence of a metal alkanoates or acetates of calcium, zinc, manganese, titanium, etc. This first step generates bis(hydroxy ethylene) teraphthalate (BHET) with the elimination of methanol and the excess EO. The BHET is heated, generally in the presence of a transesterification catalyst, to generate high polymer. This process is generally accomplished in a vented extruder to remove the polycondensate (EO) and generate the desired thermoformed object from a low viscosity precursor.

Some polycondensation reactions, such as the commercial method of synthesis of PET described above, require polymerization catalysts. Such catalysts may be difficult to prepare, may be unstable to long-term storage, or may require stringent reaction conditions to provide polymer. Moreover, these catalysts are immortal, limiting the versatility of the widely used mechanical recycling, because at high temperatures the residual catalyst causes molecular weight degradation. This limits the use of these recycled products to secondary applications (i.e., carpet, playground equipment etc.).

SUMMARY OF THE INVENTION

Accordingly, there is a need in the art for improved polymerization methods that involve mild reaction conditions, non-metallic and stable catalysts, and minimal potentially problematic by-products, while allowing for the synthesis of polymers with controlled molecular weights, low polydispersities, and/or controlled architecture (e.g., end-functionalized, branched, block copolymers, etc.).

The invention provides an efficient catalytic polymerization reaction that does not employ a metallic catalyst. Because a nonmetallic catalyst is employed, the polymerization products, in a preferred embodiment, are substantially free of metal contaminants. Furthermore, in preferred embodiments, the catalysts are substantially more stable than previous non-metallic catalysts.

In some embodiments, then, the disclosure provides a method for forming a polymer. The method comprises contacting a monomer with a nucleophilic reagent in the presence of a guanidine-containing compound to form a prepolymer. The method further comprises polymerizing the prepolymer to form a polymer. The monomer comprises at least one electrophilic moiety, and in some embodiments, the monomer comprises two electrophilic moieties separated by a linker.

In further embodiments, the disclosure provides a composition comprising a monomer, a nucleophile, and a guanidine-containing compound. The monomer comprises two electrophilic moieties separated by a linker.

In still further embodiments, the disclosure provides an improved method for polymerizing a monomer having at least one electrophilic moiety. The improvement comprises contacting the monomer with a nucleophile in the presence of a guanidine-containing compound.

Preferred catalysts herein are guanidine compounds. In some embodiments, cyclic guanidines, including monocyclic and polycyclic guanidines are used. Polycyclic guanidines suitable for the methods of the disclosure include fused and non-fused polycyclic compounds. Further details of suitable guanidine catalysts are provided below.

Additional aspects and embodiments of the invention will be provided, without limitation, in the detailed description of the invention that is set forth below.

DETAILED DESCRIPTION OF THE INVENTION

Unless otherwise indicated, this invention is not limited to specific polymers, catalysts, nucleophilic reagents, or depolymerization conditions. The terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "a polymer" encompasses a combination or mixture of different polymers as well as a single polymer, reference to "a catalyst" encompasses both a single catalyst as well as two or more catalysts used in combination, and the like.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used.

The term "alkyl" as used herein refers to a linear, branched, or cyclic saturated hydrocarbon group (i.e., a mono-radical) typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although not necessarily, alkyl groups herein may contain 1 to about 18 carbon atoms, and such groups may contain 1 to about 12 carbon atoms. The term "lower alkyl" intends an alkyl group of 1 to 6 carbon atoms. "Substituted alkyl" refers to alkyl substituted with one or more substituent groups, and this includes instances wherein two hydrogen atoms from the same carbon atom in an alkyl substituent are replaced, such as in a carbonyl group (i.e., a substituted alkyl group may include a —C(═O)-moiety). The terms "heteroatom-containing alkyl" and "heteroalkyl" refer to an alkyl substituent in which at least one carbon atom is replaced with a heteroatom, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "alkenyl" as used herein refers to a linear, branched or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein may contain 2 to about 18 carbon atoms, and for example may contain 2 to 12 carbon atoms. The term "lower alkenyl" intends an alkenyl group of 2 to 6 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkynyl" as used herein refers to a linear or branched hydrocarbon group of 2 to 24 carbon atoms containing at least one triple bond, such as ethynyl, n-propynyl, and the like. Generally, although again not necessarily, alkynyl groups herein may contain 2 to about 18 carbon atoms, and such groups may further contain 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms, and includes, for example, methoxy, ethoxy, n-propoxy, isopropoxy, t-butyloxy, etc. Substituents identified as "$C_1$-$C_6$ alkoxy" or "lower alkoxy" herein may, for example, may contain 1 to 3 carbon atoms, and as a further example, such substituents may contain 1 or 2 carbon atoms (i.e., methoxy and ethoxy). The term "alkylthio" as used herein refers to a group —S-alkyl, where "alkyl" is as defined above.

The term "aryl" as used herein, and unless otherwise specified, refers to an aromatic substituent generally, although not necessarily, containing 5 to 30 carbon atoms and containing a single aromatic ring or multiple aromatic rings that are fused together, directly linked, or indirectly linked (such that the different aromatic rings are bound to a common group such as a methylene or ethylene moiety). Aryl groups may, for example, contain 5 to 20 carbon atoms, and as a further example, aryl groups may contain 5 to 12 carbon atoms. For example, aryl groups may contain one aromatic ring or two or more fused or linked aromatic rings (i.e., biaryl, aryl-substituted aryl, etc.). Examples include phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "aralkyl" refers to an alkyl group with an aryl substituent, and the term "alkaryl" refers to an aryl group with an alkyl substituent, wherein "alkyl" and "aryl" are as defined above. In general, aralkyl and alkaryl groups herein contain 6 to 30 carbon atoms. Aralkyl and alkaryl groups may, for example, contain 6 to 20 carbon atoms, and as a further example, such groups may contain 6 to 12 carbon atoms.

The term "alkylene" as used herein refers to a di-radical alkyl group. Unless otherwise indicated, such groups include saturated hydrocarbon chains containing from 1 to 24 carbon atoms, which may be substituted or unsubstituted, may contain one or more alicyclic groups, and may be heteroatom-containing "Lower alkylene" refers to alkylene linkages containing from 1 to 6 carbon atoms. Examples include, methylene (—$CH_2$—), ethylene (—$CH_2CH_2$—), propylene (—$CH_2CH_2CH_2$—), 2-methylpropylene (—$CH_2$—CH($CH_3$)—$CH_2$—), hexylene (—$(CH_2)_6$—) and the like. Similarly, the terms "alkenylene," "alkynylene," "arylene," "aralkylene," and "alkarylene" as used herein refer to di-radical alkenyl, alkynyl, aryl, aralkyl, and alkaryl groups, respectively. Collectively, these and other di-radical groups are referred to herein as "linkers" or "linker groups." By the term "functional linker group" or "functional linker" is meant di-radical moieties that contain one or more functional groups such as an oxo (—O—, such as in an ether linkage), amine (—NR—), carbonyl (—C(═O)—), carbonate, and the like.

The term "amino" is used herein to refer to the group—$NZ^1Z^2$ wherein $Z^1$ and $Z^2$ are hydrogen or nonhydrogen substituents, with nonhydrogen substituents including, for example, alkyl, aryl, alkenyl, aralkyl, and substituted and/or heteroatom-containing variants thereof.

The terms "halo" and "halogen" are used in the conventional sense to refer to a chloro, bromo, fluoro or iodo substituent.

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, furyl, pyrimidinyl, imidazolyl, 1,2,4-triazolyl, tetrazolyl, etc., and examples of heteroatom-containing alicyclic groups are pyrrolidino, morpholino, piperazino, piperidino, tetrahydrofuranyl, etc.

"Hydrocarbyl" refers to univalent hydrocarbyl radicals containing 1 to about 30 carbon atoms, including 1 to about 24 carbon atoms, further including 1 to about 18 carbon atoms, and further including about 1 to 12 carbon atoms, including linear, branched, cyclic, saturated and unsaturated species, such as alkyl groups, alkenyl groups, aryl groups, and the like. "Substituted hydrocarbyl" refers to hydrocarbyl substituted with one or more substituent groups, and the term "heteroatom-containing hydrocarbyl" refers to hydrocarbyl in which at least one carbon atom is replaced with a heteroatom. Unless otherwise indicated, the term "hydrocarbyl" is to be interpreted as including substituted and/or heteroatom-containing hydrocarbyl moieties. The term "hydrocarbylene" refers to a di-radical hydrocarbyl group.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{20}$ aryloxy, acyl (including $C_2$-$C^{24}$ alkylcarbonyl (—CO-alkyl) and $C_6$-$C_{20}$ arylcarbonyl (—CO-aryl)), acyloxy (—O-acyl), $C_2$-$C_{24}$ alkoxycarbonyl (—(CO)—O-alkyl), $C_6$-$C_{20}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{20}$ arylcarbonato (—O—(CO)—O-aryl), carboxy (—COOH), carboxylato (—$COO^-$), carbamoyl (—(CO)—$NH_2$), mono-substituted $C_1$-$C_{24}$ alkylcarbamoyl (—(CO)—NH($C_1$-$C_{24}$ alkyl)), di-substituted alkylcarbamoyl (—(CO)—N($C_1$-$C_{24}$ alkyl)$_2$), mono-substituted arylcarbamoyl (—(CO)—NH-aryl), thiocarbamoyl (—(CS)—$NH_2$), carbamido (—NH—(CO)—$NH_2$), cyano (—C≡N), isocyano (—$N^+$≡$C^-$), cyanato (—O—C≡N), isocyanato (—O—$N^+$≡$C^-$), isothiocyanato (—S—C≡N), azido (—N═$N^+$═$N^-$), formyl (—(CO)—H), thioformyl (—(CS)—H), amino (—$NH_2$), mono- and di-($C_1$-$C_{24}$ alkyl)-substituted amino, mono- and di-($C_5$-$C_{20}$ aryl)-substituted amino, $C_2$-$C_{24}$ alkylamido (—NH—(CO)-alkyl), $C_5$-$C_{20}$ arylamido (—NH—(CO)-aryl), imino (—CR═NH where R=hydrogen, $C_1$-$C_{24}$ alkyl, $C_5$-$C_{20}$ aryl, $C_6$-$C_{20}$ alkaryl, $C_6$-$C_{20}$ aralkyl, etc.), alkylimino (—CR═N(alkyl), where R=hydrogen, alkyl, aryl, alkaryl, etc.), arylimino (—CR═N(aryl), where R=hydrogen, alkyl, aryl, alkaryl, etc.), nitro (—$NO_2$), nitroso (—NO), sulfo (—$SO_2$—OH), sulfonato (—$SO_2$—$O^-$), $C_1$-$C_{24}$ alkylsulfanyl (—S-alkyl; also termed "alkylthio"), arylsulfanyl (—S-aryl; also termed "arylthio"), $C_1$-$C_{24}$ alkylsulfinyl (—(SO)-alkyl), $C_5$-$C_{20}$ arylsulfonyl (—(SO)-aryl), $C_1$-$C_{24}$ alkylsulfonyl (—$SO_2$-alkyl), $C_5$-$C_{20}$ arylsulfonyl (—$SO_2$-aryl), phosphono (—P(O)(OH)$_2$), phosphonato (—P(O)($O^-$)$_2$), phosphinato (—P(O)($O^-$)), phospho (—$PO_2$), and phosphino (—$PH_2$), mono- and di-($C_1$-$C_{24}$ alkyl)-substituted phosphino, mono- and di-($C_5$-$C_{20}$ aryl)-substituted phosphino; and the hydrocarbyl moieties $C_1$-$C_{24}$ alkyl (including $C_1$-$C_{18}$ alkyl, further including $C_1$-$C_{12}$ alkyl, and further including $C_1$-$C_6$ alkyl), $C_2$-$C_{24}$ alkenyl (including $C_2$-$C_{18}$ alkenyl, further including $C_2$-$C_{12}$ alkenyl, and further including $C_2$-$C_6$ alkenyl), $C_2$-$C_{24}$ alkynyl (including $C_2$-$C_{18}$ alkynyl, further including $C_2$-$C_{12}$ alkynyl, and further including $C_2$-$C_6$ alkynyl), $C_5$-$C_{30}$ aryl (including $C_5$-$C_{20}$ aryl, and further including $C_5$-$C_{12}$ aryl), and $C_6$-$C_{30}$ aralkyl (including $C_6$-$C_{20}$ aralkyl, and further including $C_6$-$C_{12}$ aralkyl). In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. For example, the phrase "substituted alkyl and aryl" is to be interpreted as "substituted alkyl and substituted aryl."

Unless otherwise specified, reference to an atom is meant to include isotopes of that atom. For example, reference to H is meant to include $^1$H, $^2$H (i.e., D) and $^3$H (i.e., T), and reference to C is meant to include $^{12}$C and all isotopes of carbon (such as $^{13}$C).

By "substantially free of" a particular type of chemical compound is meant that a composition or product contains less 10 wt % of that chemical compound, for example less than 5 wt %, or less than 1 wt %, or less than 0.1 wt %, or less than 0.01 wt %, or less than 0.001 wt %. For instance, the polymerization product herein is "substantially free of" metal contaminants, including metals per se, metal salts, metallic complexes, metal alloys, and organometallic compounds.

Unless otherwise specified, the terms "guanidine compound," "guanidine catalyst," "guanidine-containing compound," and the like refer to compounds containing a guanidinyl moiety, i.e., compounds containing the structure

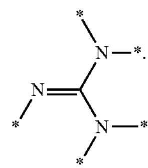

Accordingly, the invention features a method for preparing a polymer having a backbone containing electrophilic linkages. The electrophilic linkages may be, for example, ester linkages (—(CO)—O—), carbonate linkages (—O—(CO)—O)—, urethane linkages (—O—(CO)-—NH), substituted urethane linkages (—O—(CO)—NR—, where R is a nonhydrogen substituent such as alkyl, aryl, alkaryl, or the like), amido linkages (—(CO)—NH—), substituted amido linkages (—(CO)—NR— where R is as defined previously), thioester linkages (—(CO)—S—), sulfonic ester linkages (—S(O)$_2$—O—), ketone linkages (—C(═O)—), and the like. Other electrophilic linkages will be known to those of ordinary skill in the art of organic chemistry and polymer science and/or can be readily found by reference to the pertinent texts and literature.

In some embodiments, the monomer comprises two electrophilic moieties separated by a linker moiety, and has the structure $X^1$-L-$X^2$, wherein $X^1$ and $X^2$ are independently electrophilic moieties and L is the linker moiety. In some embodiments, L is selected from $C_1$-$C_{30}$ hydrocarbylene and functional linker groups. In some embodiments, L is $C_1$-$C_{30}$ hydrocarbylene. For example, L is selected from $C_1$-$C_{30}$ alkylene, $C_2$-$C_{30}$ alkenylene, $C_2$-$C_{30}$ alkynylene, $C_5$-$C_{30}$ arylene, and combinations thereof (such as $C_1$-$C_{30}$ alkylene linked with a $C_5$-$C_{30}$ arylene), wherein any of these groups may contain one or more heteroatoms and one or more substituents. Linker moieties may also be functional groups, such as heteroatom groups, including thioether (—S—), ether (—O—), and amino (—NR—) groups. In some embodiments, L is substituted or unsubstituted phenylene (1,4-, 1,3-, or 1,2-connectivity), or substituted or unsubstituted lower alkylene (e.g., methylene, ethylene, propylene, butylene, pentylene, hexylene, septylene, or octylene, including cyclic versions of such linkers).

In some embodiments, $X^1$ and $X^2$ are independently selected from ester moieties (—(CO)—O—R, wherein R is lower alkyl or the like), carboxylic acid or carbonic acid (—COOH or —OCOOH), carbonate moieties (—O—(CO)—O—R, wherein R is lower alkyl or the like), urethane moieties (—O—(CO)—NH—R, wherein R is H, lower alkyl, or the like), substituted urethane moieties (—O—(CO)—NR'—R, where R' is a nonhydrogen substituent such as alkyl, aryl, alkaryl, or the like), amido moieties (—(CO)—NH—R, wherein R is H, lower alkyl, or the like), substituted amido moieties (—(CO)—NR'—R where R' is as defined previously), thioester moieties (—(CO)—S—R, wherein R is H, lower alkyl, or the like), sulfonic ester moieties (—S(O)$_2$—O—R, wherein R is H, lower alkyl, or the like), and the like. For example, $X^1$ and $X^2$ are lower alkyl esters (e.g., methyl esters or ethyl esters) or amine groups.

Examples of polymers that can be prepared using the methodology of the invention include, without limitation: poly(alkylene terephthalates) such as poly(ethylene terephthalate) (PET), fiber-grade PET (a homopolymer made from monoethylene glycol and terephthalic acid), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ϵ-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); poly(alkylene carbonates) such as poly(propylene carbonate); polyurethanes; and polyurethane/polyester copolymers.

The monomers for polymerization may be obtained from any suitable source. In one preferred embodiment, the monomers are depolymerization products from recycled post-consumer waste. In another embodiment, the monomers are virgin feedstock.

Polymerization of the monomer is carried out, as indicated herein, in the presence of a nucleophilic reagent and a catalyst. Nucleophilic reagents are those that comprise one or more nucleophilic groups, such as hydroxyl, ether, carboxylato (e.g., —COO$^-$), amine, azide, sulfhydryl, and the like. Nucleophilic reagents therefore include monohydric alcohols, diols, polyols, amines, diamines, polyamines, sulfhydryls, disulfhydryls, polysulfhydryls, and combinations thereof. Thus, the nucleophilic reagents may contain a single nucleophilic moiety or two or more nucleophilic moieties, e.g., hydroxyl, sulfhydryl, and/or amino groups.

In some embodiments, the nucleophilic reagent consists of a single nucleophilic group, and has the structure R-$Nu^1$, wherein R is a $C_1$-$C_{30}$ hydrocarbyl group and $Nu^1$ is any nucleophilic group such as those previously described.

In some embodiments, nucleophilic reagents comprise two nucleophilic groups separated by a linker, and have the structure $Nu^1$-$L^1$-$Nu^2$, wherein $Nu^1$ is as described previously, $Nu^2$ is a nucleophilic group (such as those described for $Nu^1$) and wherein $L^1$ is as described previously for L. Examples of such difunctional nucleophilic reagents include alkyl diols, aryl diols, alkyl diamines, aryl diamines, amino alcohols, amino thiols, and the like.

In some embodiments, the nucleophilic reagent comprises three nucleophilic groups, and has the structure

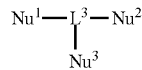

(also written $Nu^1$-$L^3$($Nu^2$)$Nu^3$) wherein $Nu^1$ and $Nu^2$ are as described previously, $Nu^3$ is a nucleophilic group (such as those described for $Nu^1$), and $L^3$ may be any of the linkers described previously for $L^1$, provided that linker $L^3$ has at least three non-hydrogen substituents (i.e., $Nu^1$-$Nu^3$). Such nucleophilic reagents allows cross linking reactions to occur. Any combination of nucleophilic reagents (having the same or a different number of nucleophilic groups) may be used.

In some embodiments, the nucleophilic reagent will be present in excess of the monomer, meaning that the number of nucleophilic groups exceeds the number of electrophilic groups at the beginning of the reaction. In some other embodiments, the ratio of nucleophilic groups to electrophilic groups is 1:1.

A few specific examples of suitable nucleophilic groups include methanol, ethanol, propanol, butanol, ethylene glycol, propylene glycol, methylamine, ethylamine, ethylenediamine, propylenediamine, methanethiol, ethanethiol, as well as the following:

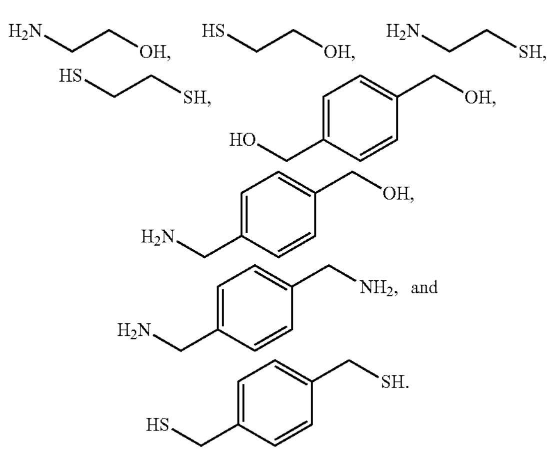

Preferred catalysts for the polymerization reactions are organic compounds containing a guanidine moiety. In some preferred embodiments, the polymerization catalysts are organic guanidines having the structure of formula (I)

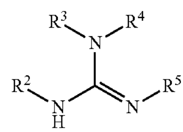

(I)

wherein $R^2$, $R^3$, $R^4$ and $R^5$ are independently selected from hydrogen and $C_1$-$C_{30}$ hydrocarbyl, provided that any two of $R^2$, $R^3$, $R^4$ and $R^5$ may be linked to form a cycle. In preferred embodiments, at least two of $R^2$, $R^3$, $R^4$ and $R^5$ are linked to form a cycle, such that the compound is a cyclic guanidine compound.

For example, $R^2$, $R^3$, $R^4$ and $R^5$ are independently selected from substituted or unsubstituted $C_1$-$C_{30}$ alkyl, $C_2$-$C_{30}$ alkenyl, $C_2$-$C_{30}$ alkynyl, $C_5$-$C_{30}$ aryl, $C_6$-$C_{30}$ aralkyl, and $C_6$-$C_{30}$ alkaryl, any of which may be heteroatom-containing. As mentioned previously, the alkyl, alkenyl, and alkynyl groups include linear, branched, and cyclic such groups. The aryl, aralkyl, and alkaryl groups include multicyclic groups such as annulated and linked ring systems.

In some embodiments of formula (I), $R^2$ and $R^3$ are taken together to form a cycle, and $R^4$ and $R^5$ are taken together to form a cycle, such that an annulated ring system is formed. Preferred embodiments include compounds having the structure of formula (Ia)

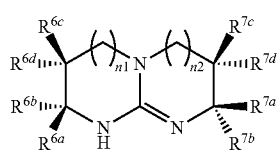

(Ia)

wherein n1 and n2 are independently selected from zero and 1; and $R^{6a}$, $R^{6b}$, $R^{6c}$, $R^{6d}$, $R^{7a}$, $R^{7b}$, $R^{7c}$, and $R^{7d}$ are independently selected from H, substituted or unsubstituted $C_1$-$C_{30}$ alkyl, $C_2$-$C_{30}$ alkenyl, $C_2$-$C_{30}$ alkynyl, $C_5$-$C_{30}$ aryl, $C_6$-$C_{30}$ aralkyl, and $C_6$-$C_{30}$ alkaryl, any of which may be may be heteroatom-containing, provided that any two of $R^{6a}$, $R^{6b}$, $R^{6c}$, $R^{6d}$, $R^{7a}$, $R^{7b}$, $R^{7c}$, and $R^{7d}$ may be taken together to form a ring.

In some embodiments of formula (Ia), n1 is zero and n2 is 1. In some embodiments of formula (Ia), n2 is zero and n1 is 1. In some embodiments of formula (Ia), n1 and n2 are both zero. In some embodiments of formula (Ia), n1 and n2 are both 1.

In some embodiments of formula (Ia), one of $R^{6a}$ and $R^{6b}$ is $C_5$-$C_{30}$ aryl, and the other is Hydrogen, and one of $R^{7a}$ and $R^{7b}$ is $C_5$-$C_{30}$ aryl, and the other is H. In some such embodiments, the $C_5$-$C_{30}$ aryl group is phenyl.

In some embodiments of formula (Ia), $R^{6c}$, $R^{6d}$, $R^{7c}$, and $R^{7d}$ are each H. Examples of such embodiments include the following compounds:

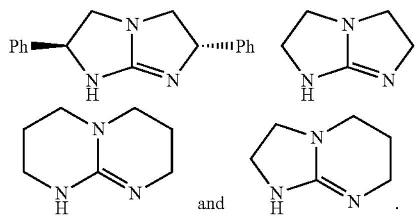

In some embodiments of formula (I), $R^3$ and $R^4$ are taken together to form a cycle. For example, preferred embodiments include compounds having the structure of formula (Ib)

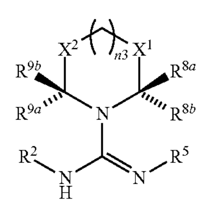

(Ib)

wherein n3 is selected from 0 and 1;

$X^1$ and $X^2$ are independently selected from —$NR^{10}$— and —$C(R^{11})(R^{12})$—, wherein $R^{10}$, $R^{11}$, and $R^{12}$ are independently selected from H and alkyl; and $R^{8a}$, $R^{8b}$, $R^{9a}$, and $R^{9b}$ are independently selected from alkyl, aryl, aralkyl, and alkaryl, provided that any two of $R^{8a}$, $R^{8b}$, $R^{9a}$, $R^{9b}$, $R^{10}$, $R^{11}$, and $R^{12}$ may be taken together to form a cycle.

In some embodiments of formula (Ib), $R^{9a}$ and $R^{9b}$ are both H, and $X^1$ and $X^2$ are both —$CH_2$—, such that the compounds have the structure of formula (Ic)

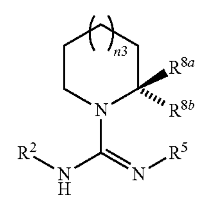

(Ic)

Further examples of embodiments of formula (Ib) include compounds having the structures

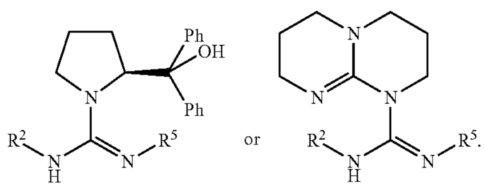

In some embodiments of the structures shown above, $R^2$ and $R^5$ are independently selected from substituted or unsubstituted $C_1$-$C_{30}$ alkyl and substituted or unsubstituted heteroatom-containing $C_1$-$C_{30}$ alkyl. For example, $R^2$ and $R^5$ may be $C_3$-$C_{30}$ alicyclic, such as cyclopropyl, cyclobutyl, cyclopentyl, cyclohexyl (Cy), cycloheptyl, or cyclooctyl. Also, for example, $R^2$ and $R^5$ may be methyl, ethyl, propyl (i-propyl, n-propyl), or butyl (t-butyl, n-butyl, sec-butyl), or may be heteroatom-containing such as 3-dimethylaminopropyl or a salt thereof.

In some embodiments, the guanidine-containing compounds described herein are chemically more stable than other catalysts capable of causing depolymerization, such as N-heterocyclic carbene catalysts. In some embodiments, compared with N-heterocyclic carbene catalysts under similar conditions, the guanidine-containing compounds decompose at a substantially lower rate. Preferred catalysts are substantially stable under some or all of the depolymerization conditions described herein.

The guanidine-containing compounds described herein may be synthesized by any appropriate method, and such methods are readily ascertainable from the relevant literature. For example, cyclic guanidines may be prepared using the methods disclosed in U.S. Pat. No. 4,797,487 entitled "Production of Bicyclic Guanidines from Bis(aminoalkyl)amine." It will be appreciated that the handling of certain guanidine-containing compounds may require precautions to avoid decomposition. For example, mixing of the reaction components may require an inert atmosphere.

The polymerization catalysts of the disclosure (i.e., guanidine-containing compounds) are typically present in the reaction mixture in an amount (i.e., a "catalyst loading") that is less than 5 mol %, or less than 2 mol %, or less than 1 mol %, or less than 0.5 mol %, or less than 0.1 mol %, with less than 1 mol % being particularly preferred. Such catalyst loadings are measured as mol % relative to the total amount of monomer used in the reaction.

The polymerization reaction occurs by initial formation of a prepolymer comprising the product of a reaction between the monomer and nucleophilic reactant, and subsequent condensation polymerization of the prepolymer. In some embodiments, the prepolymer comprises one or more electrophilic groups and one or more nucleophilic groups; for example the prepolymer comprises two nucleophilic groups and two electrophilic groups. In such embodiments, the condensation reaction may occur as the electrophilic group of one prepolymer molecule reacts with the nucleophilic group of another prepolymer molecule. In embodiments where the condensation reaction produces non-polymeric byproducts (particularly small organic molecules such as water, $H_2$, ethylene glycol, propylene glycol, etc.), such products may be removed during the reaction to help the polymerization achieve higher molecular weight polymers.

The initial formation of the prepolymer may be carried out in a suitable solvent, or without any solvent. The nucleophilic reagent may function as a solvent. When a separate solvent is used, it is preferable that the solvent is removed prior to polymerization of the prepolymer. Thus, in some embodiments, the polymerization reaction is started in a solvent for a predetermined period of time, after which time the solvent is removed (such as by applying reduced pressure and/or increased temperature), and the polymerization is allowed to continue for a period of time sufficient to provide polymer of the desired molecular weight.

The polymerization reaction may be carried out in an inert atmosphere. In carrying out the reactions, combination of the reactants may be accomplished in any order. For example, the reactants can be combined by dissolving a catalytically effective amount of the selected catalyst in a solvent, combining the monomer and the catalyst solution, and then adding the nucleophilic reagent. In a particularly preferred embodiment, the monomer, the nucleophilic reagent, and the catalyst are combined and dissolved in a suitable solvent, and polymerization thus occurs in a one-pot, one-step reaction.

The reaction mixture is typically, although not necessarily, agitated (e.g., stirred), and the progress of the reaction can be monitored by standard techniques, although visual inspection is generally sufficient. Examples of solvents that may be used in the polymerization reaction include organic, protic, or aqueous solvents that are inert under the polymerization conditions, such as aromatic hydrocarbons, chlorinated hydrocarbons, ethers, aliphatic hydrocarbons, or mixtures thereof. Preferred solvents include toluene, methylene chloride, tetrahydrofuran, methyl t-butyl ether, Isopar, gasoline, and mixtures thereof. Reaction temperatures are in the range of about 25° C. to about 300° C. The total polymerization reaction time will generally, although again not necessarily, be in the range of about 1 to 24 hours.

In some embodiments, the reactions are carried out by first combining the monomer with the nucleophilic reagent and the catalyst in a solvent. After allowing sufficient time for the monomer to react with the nucleophilic reagent to form a prepolymer, the reaction conditions are changed to encourage polymerization of the prepolymer. For example, elevated temperature and/or reduced pressure may be applied in order to force the condensation of prepolymer molecules. In some embodiments, the temperature of the reaction after formation of the prepolymer is raised to between 100° C. and 200° C., or greater than about 150° C., or greater than about 170° C. The amount of time required to form the prepolymer from the monomer and the nucleophilic reagent will vary depending upon the reactants and conditions, but may be estimated or determined by the usual analytical methods. The temperature during formation of the prepolymer may be room temperature or higher, for example between 30° C. and 100° C.

The polymerization product from reactions according to the invention contains product polymer and the guanidine-containing catalyst, which may be removed from the polymer product in the usual manner.

Because the polymerization catalysts disclosed herein do not contain metals, the methods of the disclosure allow for the polymerization of a monomer starting material to provide a polymerization product that is substantially free of metal contaminants. In particular, the concentration of metal contaminants in the polymer products is equal to or less than the concentration of metal contaminants in the starting materials prior to polymerization. For example, when a sample of dimethyl terephthalate (DMT) is polymerized according to the invention, and the sample of DMT has a certain concentration of metal contaminant (e.g., residual metals from any reaction that was used to prepare the DMT, such as a metal catalyst used in a depolymerization reaction recycling PET into DMT via depolymerization), the polymerization reaction according to the invention does not increase the total concentration of metal contaminants. The polymer products (e.g., PET) contain the same or lower concentration of metal contaminants as the starting materials. A lower concentration of metal contaminant may be observed if the polymer products are subjected to any purification steps (such as precipitation, filtration, etc.). As a further example, a sample of DMT having no metal contaminants (or an undetectable level of metal contaminants) may be polymerized according to the invention to yield polymer products having no metal contaminants (or an undetectable level of metal contaminants).

In some embodiments, the polymerization reactions of the disclosure allow preparation of polymer products having a metal contaminant concentration that is immeasurable or equal to or less than the metal contaminant concentration of the starting materials used to prepare the polymer. Such polymer products may have substantially less metal contaminant concentrations than similar polymers prepared using conventional (i.e., metal catalyzed) polymerization methods.

For example, depending on the method of manufacture, conventional PET used for drinking bottles may have a residual metal contamination level of up to 50 ppm, or up to 20 ppm, or up to 5 ppm. In some embodiments, the methods of the invention provide PET suitable for food and beverage storage since the level of metal contamination of the polymerization products will be no higher than the level of metal contamination of the original monomer. Thus, in some embodiments, the methods of the invention provide polymers having a metal contamination concentration of ≤50 ppm, or ≤20 ppm, or ≤5 ppm, or below 1 ppm.

The methods described herein find utility, for example, in the preparation of polymers and items made from polymers, the use of recycled polymer depolymerization products, and similar areas as described herein throughout.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description as well as the examples that follow, are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

EXAMPLES

Example 1

Sample 1 is a PET that was polymerized (bulk) with 2 mol % of catalysts relative to DMT. Since the concentration of ethylene glycol tends to vary during the course of the polymerization, all catalysts loadings are relative to dimethyl terephthalate (DMT). The maximum polymerization temperature in the case was 200° C.

DMT (0.5 grams, 0.0025 mol) was added to a round bottom flask together with ethylene glycol (0.62 grams, 0.01 mol). To this slurry, TBD (0.006 grams, 0.00005 mol) was added. The reaction was heated to 40° C. under vacuum (3 hours), 100° C. (1 hour) and 200° C. for 3 hours.

Example 2

Sample 2 was also PET that was polymerized with 1.5 mol % catalyst relative to DMT. The maximum polymerization temperature in this case was 275° C.

DMT (3.0 grams, 0.015 mole) and ethylene glycol (6.5 grams, 0.01 mol) was added to a round bottom flask together with TBD (0.01 grams, 0.000075 mol). The reaction was heated to 40° C. under nitrogen (2 hours), heated to 60° C. under vacuum (30 min) and heated to 100° C. (vacuum, 1 hour). The reaction was then heated to 150° C. (vacuum, 35 min. where it became homogeneous. The reaction was then heated to 200° C. (1.5 hours) and then 275° C. (1 hour) to finish the reaction.

The product polymers were characterized by $^{1}$H NMR.

Example 3

Combining bis(hydroxy ethylene) terephthalate (BHET) with 1,5,7-triazabicyclo[4.4.0]dec-5-ene (TBD) and heating the mixture under vacuum results in the formation of poly (ethylene terephthalate). Polymerization can also be carried out by heating dimethyl terephthalate with ethylene glycol in the presence of TBD catalysts followed by heating under vacuum. This process is shown in Scheme 1.

Scheme 1

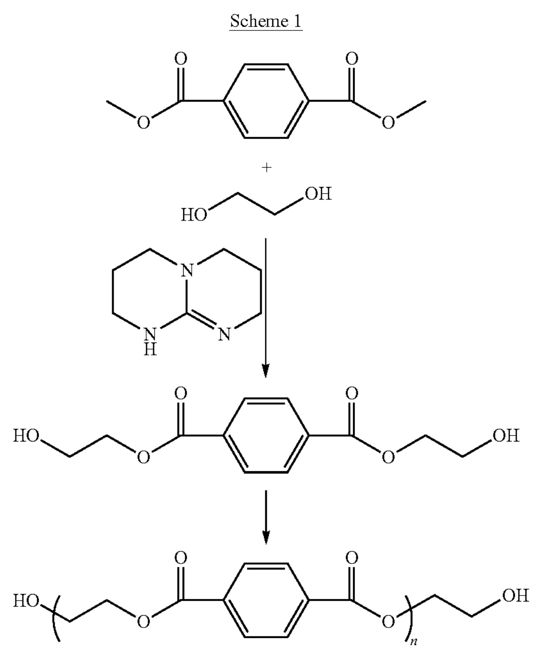

Example 4

Synthesis of 1,4,6-triazabicyclo[3.3.0]-oct-4-ene (TBO). With stirring at room temperature under nitrogen atmosphere, xylenes (300 mL), diethylenetriamine (20.6 g, 21.7 mL, 0.2 mol), and carbon disulfide (15.2 g, 12.0 mL, 0.2 mol) were added to a three-necked flask. A white precipitate formed immediately and the suspension was heated to reflux. Evolution of $H_2S$ from the reaction exhaust was monitored using filter paper soaked in a methanolic suspension of lead(II) acetate. After 10 days of reflux under nitrogen, GC/MS analysis confirmed quantitative conversion to the target compound. Upon cooling to room temperature a white solid crystallized from solution, and the supernatant was decanted. The solid was washed with 2×50 mL portions of acetone and pentane, respectively, and dried under vacuum overnight. (8.65 g, 39%). $^1$H NMR 400 MHz ($CDCl_3$).differential. (ppm)=6.02 [br s, 1H, N—H], 3.79 [t, 2H, backbone $CH_2$, J=7.0 Hz], 3.05 [t, 2H, backbone $CH_2$, J=7.0 Hz]. $^{13}$C NMR 100.6 MHz ($CDCl_3$).differential. (ppm)=171.18 [central $sp^2$ C], 52.62 [backbone $CH_2$], 49.38 [backbone $CH_2$]. LRMS (m/z): 112.1 (positive ion, M+H).

Example 5

Synthesis of Guanidine catalysts. The general procedure is shown in Scheme 2.

Scheme 2

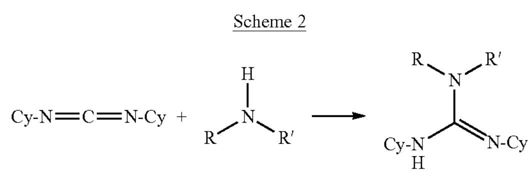

DCC was reacted neat (110° C.) with a secondary amine. Once the DCC melted a homogeneous solution was formed and the reaction was allowed to proceed overnight to generate a viscous oil/gel. The reaction was followed by GC/MS and quantitative conversion of starting material was accomplished in .about.12 hours. Compounds were purified either by kugelroh distillation or by column chromatography.

Synthesis of Guanidinium 1: Dicyclohexylcarbodiimide (3 g, 14.8 mmol) and pyrrolidine (10 ml, 120 mmol) were heated to reflux overnight under $N_2$. The excess pyrrolidine was distilled off and the product was purified by Kugelroh distillation (265° C.) to yield a colorless oil. The product guanidine compound has the structure shown below.

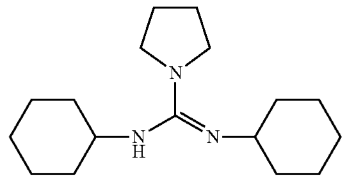 [SMILES: C1CCC(/N=C(/NC2CCCCC2)N2CCCC2)CC1]

Synthesis of Guanidinium 2: DCC (0.93 g, 4.52 mmol) and TBD (0.66 g, 4.76 mmol) were allowed to react for 20 (125° C. under $N_2$). The gel like product was purified by Kugelroh distillation 265° C. to yield a white crystalline solid $T_m$=69-71° C. The product guanidine compound has the structure shown below.

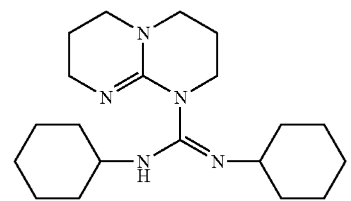 [SMILES: C1CCC(/N=C(/NC2CCCCC2)N2CCCN3CCCN=C32)CC1]

Synthesis of Guanidinium 3: DCC (0.70 g, 3.39 mmol) and (s)-(−) α,α-diphenyl-2-pyrrolidinemethanol (0.86 g, 3.39 mmol) were heated (under $N_2$) at 80° C. for 20 h. Temperatures above 100° C. resulted in decomposition. The product was purified using column chromatographs (ethyl acetate/hexane (60/40)) to yield a white crystalline solid $T_m$=104-106° C. The product guanidine compound has the structure shown below.

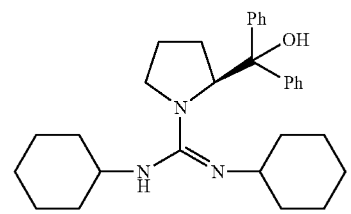 [SMILES: OC(c1ccccc1)(c1ccccc1)[C@@H]1CCCN1/C(=N\C1CCCCC1)NC1CCCCC1]

We claim:

1. A composition comprising a monomer, a nucleophile, and a guanidine-containing compound according to Formula (Ib)

(Ib)

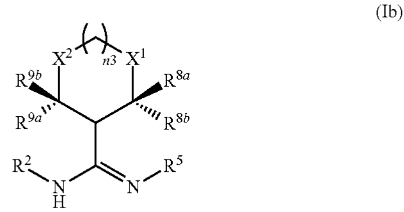

wherein the monomer comprises two electrophilic moieties separated by a linker and further wherein:

n3 is selected from 0 and 1;

$X^1$ and $X^2$ are independently selected from the group consisting of —$NR^{10}$— and —$C(R^{11})(R^{12})$—, wherein $R^{10}$, $R^{11}$, and $R^{12}$ are independently selected from H and alkyl;

$R^2$ and $R^5$ are independently selected from the group consisting of substituted and unsubstituted $C_1$-$C_{30}$ alkyl; and $R^{8a}$, $R^{8b}$, $R^{9a}$, and $R^{9b}$ are independently selected from the group consisting of H and substituted and unsubstituted alkyl, aryl, aralkyl, and alkaryl, any of which may be heteroatom-containing, provided that any two of $R^{8a}$, $R^{8b}$, $R^{9a}$, $R^{9b}$, $R^{10}$, $R^{11}$, and $R^{12}$ may be taken together to form a cycle.

2. The composition of claim 1, wherein the guanidine-containing compound has the structure

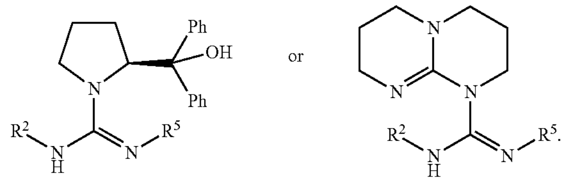

3. The composition of claim 1, wherein the guanidine-containing compound is present in an amount effective to cause reaction of the electrophilic moiety with the nucleophile.

4. The composition of claim 1, wherein the guanidine-containing compound is present in an amount less than about 1 mol % relative to the amount of monomer.

5. The composition of claim 1, wherein the nucleophile comprises at least one hydroxyl group.

6. The composition of claim 1, wherein the electrophilic moieties are selected from ester, carbonate, urethane, substituted urethane, phosphate, amido, substituted amido, thioester, sulfonate ester, and combinations thereof.

7. The composition of claim 1, wherein the monomer has the structure $X^1$-L-$X^2$, wherein $X^1$ and $X^2$ are electrophilic moieties independently selected from esters, carbonates, urethanes, substituted urethanes, phosphates, amido groups, substituted amido groups, thioesters, and sulfonate esters, and L is a linker moiety selected from $C_1$-$C_{30}$ hydrocarbylene and functional linker groups.

8. The composition of claim 7, wherein $X^1$ and $X^2$ are ester moieties.

9. The composition of claim 7, wherein L is selected from substituted and unsubstituted $C_1$-$C_{24}$ alkylene, substituted and unsubstituted $C_5$-$C_{24}$ arylene, substituted and unsubstituted $C_5$-$C_{24}$ alkarylene, and substituted and unsubstituted $C_5$-$C_{24}$ aralkylene.

10. A polymer comprising the composition of claim 1, wherein the polymer is selected from the group consisting of poly(alkylene terephthalates), poly(alkylene adipates), poly (alkylene suberates), poly(alkylene sebacates), poly(alkylene isophthalates), poly(alkylene sulfonyl-4,4'-dibenzoates), poly(alkylene 2,6-naphthalene-dicarboxylates), poly(p-phenylene alkylene dicarboxylates), poly(trans-1,4-cyclohexanediyl alkylene dicarboxylates), poly(1,4-cyclohexane-dimethylene alkylene dicarboxylates), poly([2.2.2]-bicyclooctane-1,4-dimethylene alkylene dicarboxylates), polycarbonates of bisphenol A, polyamides, poly(alkylene carbonates), lactic acid polymers and copolymers, polyurethanes and polyurethane/polyester copolymers, poly(ϵ-caprolactone), and poly(β-propiolactone).

11. A polymer comprising the composition of claim 1, wherein the polymer comprises poly(ethylene terephthalate) (PET).

12. A polymer comprising the composition of claim 1, wherein the polymer comprises poly(butylene terephthalate) (PBT).

13. A polymer comprising the composition of claim 1, wherein the polymer comprises poly(hexamethylene terephthalate).

14. A polymer comprising the composition of claim 1, wherein the polymer is selected from the group consisting of poly(ethylene adipate), poly(1,4-butylene adipate), and poly (hexamethylene adipate).

15. A polymer comprising the composition of claim 1, wherein the polymer is selected from the group consisting of poly(ethylene suberate), poly(ethylene sebacate), poly(ethylene isophthalate), and poly(ethylene sulfonyl-4,4'-dibenzoate).

16. A polymer comprising the composition of claim 1, wherein the polymer is selected from the group consisting of poly(ethylene 2,6-naphthalene-dicarboxylate), poly(p-phenylene ethylene dicarboxylates), poly(trans-1,4-cyclohexanediyl ethylene dicarboxylate), poly(1,4-cyclohexane-dimethylene ethylene dicarboxylate), and poly([2.2.2]-bicyclooctane-1,4-dimethylene ethylene dicarboxylate).

17. A polymer comprising the composition of claim 1, wherein the polymer is selected from the group consisting of 3,3'-dimethylbisphenol A; 3,3',5,5'-tetrachlorobisphenol A; and 3,3',5,5'-tetramethylbisphenol A.

18. A polymer comprising the composition of claim 1, wherein the polymer comprises poly(p-phenylene terephthalamide).

19. A polymer comprising the composition of claim 1, wherein the polymer comprises polypropylene carbonate).

20. A polymer comprising the composition of claim 1, wherein the polymer is selected from the group consisting of (S)-polylactide, (R,S)-polylactide, poly(tetramethylglycolide), and poly(lactide-co-glycolide).

* * * * *